United States Patent
Fernandes De Carvalho et al.

(10) Patent No.: US 11,511,932 B2
(45) Date of Patent: *Nov. 29, 2022

(54) PORTION PACK AND METHOD FOR PRODUCING A BEVERAGE

(71) Applicant: MELITTA SINGLE PORTIONS GMBH & CO. KG, Minden (DE)

(72) Inventors: Kerstin Fernandes De Carvalho, Bielefeld (DE); Jan Pahnke, Minden (DE); Gerold Schandl, Minden (DE); Holger Feldmann, Willich (DE)

(73) Assignee: MELITTA SINGLE PORTIONS GMBH & CO. KG, Minden (DE)

( * ) Notice: Subject to any disclaimer, the term of this patent is extended or adjusted under 35 U.S.C. 154(b) by 144 days.

This patent is subject to a terminal disclaimer.

(21) Appl. No.: 16/961,234

(22) PCT Filed: Jan. 22, 2019

(86) PCT No.: PCT/EP2019/051521
§ 371 (c)(1),
(2) Date: Jul. 9, 2020

(87) PCT Pub. No.: WO2019/141871
PCT Pub. Date: Jul. 25, 2019

(65) Prior Publication Data
US 2021/0061548 A1   Mar. 4, 2021

(30) Foreign Application Priority Data
Jan. 22, 2018 (DE) .......................... 102018101333.7

(51) Int. Cl.
*B65D 85/804* (2006.01)
*B01D 29/085* (2006.01)

(52) U.S. Cl.
CPC ....... *B65D 85/8061* (2020.05); *B01D 29/085* (2013.01)

(58) Field of Classification Search
CPC .............. B65D 85/812; B65D 85/3102; B65D 85/8043; B65D 85/8046; B65D 85/8061
See application file for complete search history.

(56) References Cited

U.S. PATENT DOCUMENTS 2,234,397 A * 3/1941 Wolfgang ............... A47J 31/06
  D7/400
4,560,475 A * 12/1985 Kataoka ............. B65D 85/8061
  D23/209

(Continued)

FOREIGN PATENT DOCUMENTS

CN   101678952 A   3/2010
DE   69013577 T2   3/1995

(Continued)

OTHER PUBLICATIONS

Himbas, EP 2752375, Machind translation. (Year: 2014).*

(Continued)

*Primary Examiner* — Drew E Becker
*Assistant Examiner* — Chaim A Smith
(74) *Attorney, Agent, or Firm* — FisherBroyles, LLP; Robert Kinberg

(57) ABSTRACT

A portion pack for producing a beverage includes a container made of filter material in which an extraction material is arranged. The container has an upper side and a pivotable edge portion that is initially arranged in a closed position to close the upper side of the container. A supporting body encloses at least regions of the container. The container is held closed by a closure mechanism which is adapted to be releasable by moistening the supporting body with water to cause the pivotable edge portion to pivot upwardly to a beverage preparation position in which the upper side of the container is open. The invention also relates to a method for producing a beverage using such a portion pack.

17 Claims, 12 Drawing Sheets

(56) References Cited

U.S. PATENT DOCUMENTS 5,059,325 A * 10/1991 Iida ..................... A47J 31/02
210/474
5,605,710 A   2/1997 Pridonoff et al.

FOREIGN PATENT DOCUMENTS

| DE | 19520837 A1 | 12/1996 |
| DE | 102013200114 A1 | 7/2014 |
| EP | 0268847 B1 | 6/1988 |
| EP | 0401951 B1 | 12/1990 |
| EP | 2752375 A1 | 7/2014 |

OTHER PUBLICATIONS

Chinese First Office Action in corresponding Chinese Patent Application No. 201980009664.5, dated Sep. 3, 2021, 10 pages.
German Search Report in corresponding German Patent Application No. 10 2018 101 333.7, dated Jul. 19, 2018, 14 pages with google English translate.
International Search Report in corresponding International Patent Application No. PCT/EP2019/051521, dated May 9, 2019, 2 pages English translation.

* cited by examiner

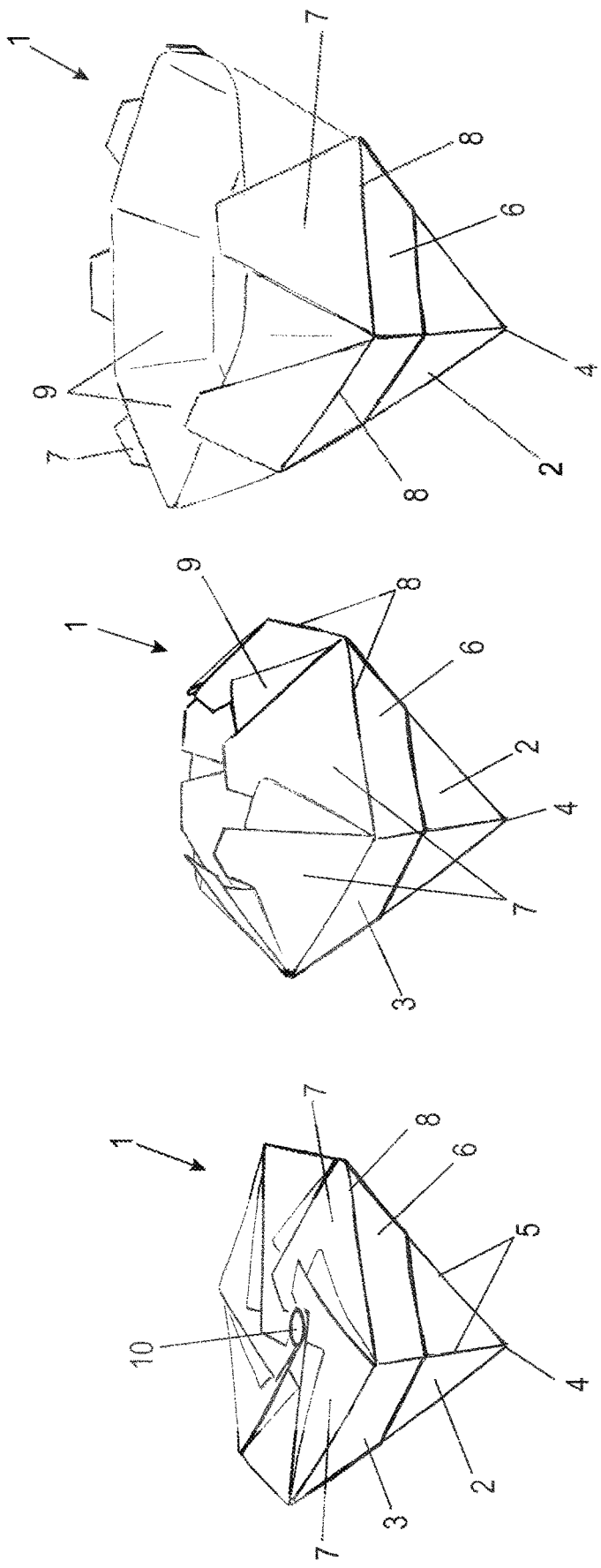

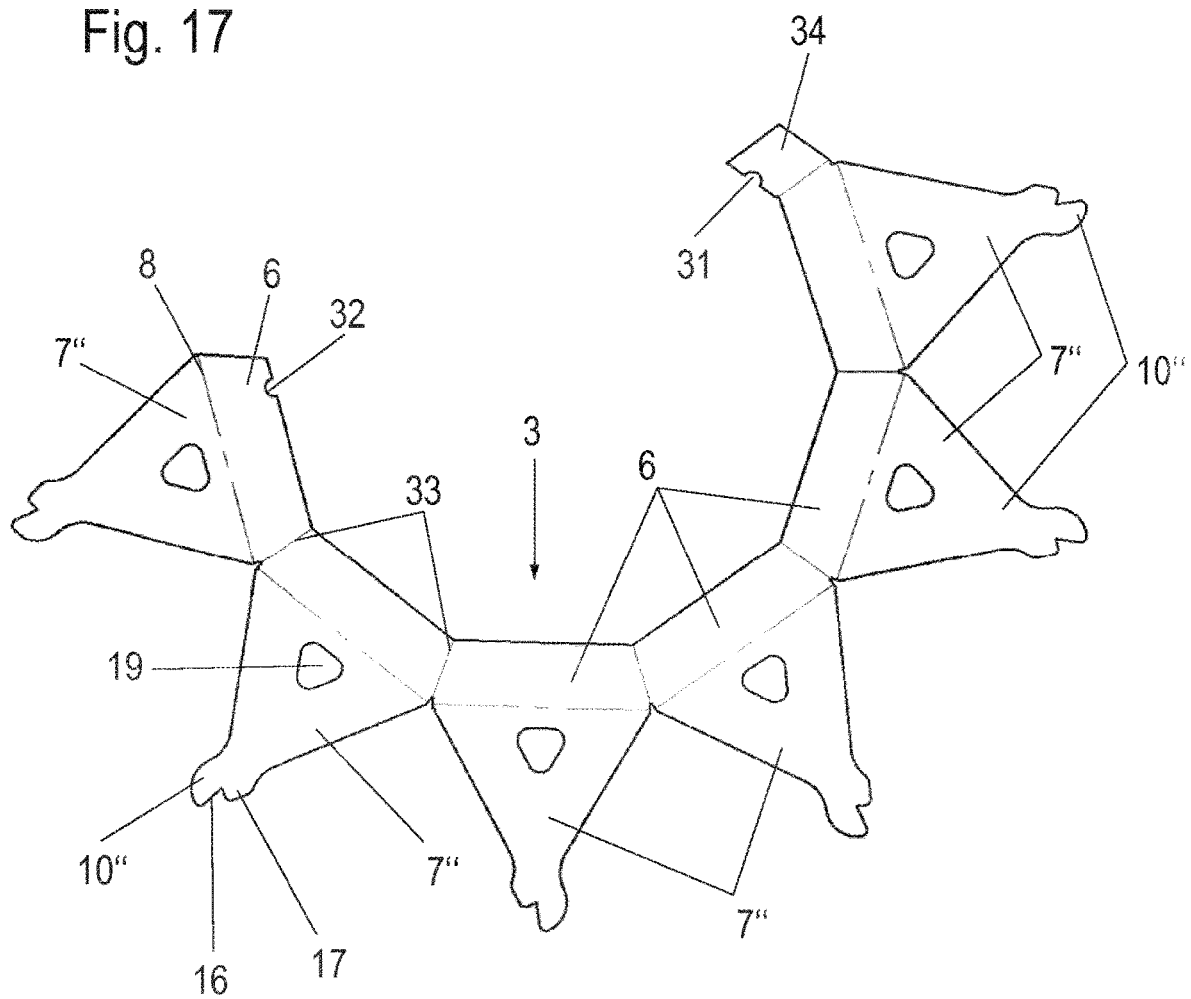

PORTION PACK AND METHOD FOR PRODUCING A BEVERAGE

CROSS-REFERENCE TO RELATED APPLICATIONS

This application is a U.S. National Stage of international Patent Application No. PCT/EP2019/051521 filed on Jan. 22, 2019, which claims benefit of German Patent Application No. 10 2018 101 333.7 filed Jan. 22, 2018.

TECHNICAL FIELD

The present invention relates to a portion pack for producing a beverage, in particular coffee, comprising a container made of filter material in which an extraction material is arranged, and a supporting body which surrounds the container at least in some areas, wherein the container is closed in a starting position and can be opened by pivoting at least one portion of an edge of the filter material, and a method for producing a beverage with a portion pack.

BACKGROUND OF THE INVENTION

For the preparation of coffee, there are filters which, according to EP 268 847 B1, have a cardboard holding frame that can be placed on a container and a filter bag made of filter paper. This allows the filter bag to be held in a predetermined position over the holding frame so that the user fills the filter bag to brew coffee and then performs a brewing operation. Although the individual filling of the filter paper and manual brewing allows the coffee taste to be individually taken into account during preparation, grinding and filling the filter bag with ground coffee and subsequent manual brewing is comparatively complex.

DE 195 20 837 A1 shows a portioned coffee filter bag with ground coffee, which may be formed in a vacuum-packed manner and is ready for use after removal from the packaging. Such portion packs are known in many forms and have the disadvantage that the needs are not sufficiently taken into account when preparing coffee. When brewing coffee, the volume of the ground coffee increases and, unlike when making espresso under high pressure, the ground coffee should be able to extend when the coffee is poured over with hot water from above. In addition, a defined coffee bed geometry and an even moisturization of the ground coffee are required when producing high-quality coffee drinks, which is often not achieved with conventional portion packs.

EP 401 951 B1 discloses a filter device with a filter hag made of paper and a supporting body that can be placed on a cup.

SUMMARY OF THE INVENTION

It is an object of the present invention to create a portion pack for the production of a beverage, in particular coffee, and a method for the production of a beverage, by which a simple preparation is possible with high quality. The transport volume of the portion pack should be small without restricting the volume during preparation.

The above and other objects are solved with a portion pack for producing a beverage from an extraction material which in one embodiment includes a container made of filter material, which is surrounded at least in some areas by a supporting body, is held closed in a starting position, and then a closure means is released in order to open the portion pack and thus provide direct access to the extraction material for a beverage preparation. During subsequent beverage preparation, the volume of the extraction material can expand without being compressed by a closed wrapper. This prevents quality losses, especially when preparing coffee by flotation and filtration.

The closure means on the portion pack can be released by moistening with water. The closure means can, for example, consist of water-soluble adhesive, which is approved for the preparation of food and may contain starch or other natural adhesives. By moistening the closure means with water the portion pack can be opened. Opening preferably takes place automatically, for example by pre-tensioning the portion pack. Which then opens after the closure agent has been released. However, water is preferably used for opening by moistening the supporting body with water on at least one folding edge and thereby changing its shape. Another possibility is to weaken the closure means itself until it fails or to reduce the rigidity of a plug connection. A closure means can also be formed by a mechanical latching or retaining means, which can then be unlocked manually or b moistening.

In one embodiment, there is provided a portion pack for producing a beverage from an extraction material, comprising: a container comprised of filter material in which the extraction material is to be arranged, the container having an upper side and at least one pivotable edge portion that is arranged to close the upper side of the container, a supporting beds surrounding the container at least in some areas; and a closure means to hold the at least one pivotable edge portion of the container in a closed position in which the upper side of the container is closed by the at least one pivotable edge portion and which is adapted to be releasable for a beverage preparation process by moistening the supporting body with water to cause the at least one pivotable edge portion to pivot upwardly to a beverage preparation position in which the upper side of the container is open.

In one embodiment, the pivoting flaps of the supporting body are arranged in at least planes one on top of the other in a closed position of the portion pack in order to make the closure of the portion pack particularly stable.

In one embodiment, the supporting both may have several flaps on one upper side of the container in to closed position, which are connected to a section of the supporting body on a side wall of the container via folding edges. By moistening the folding edges, a swelling process can be set in motion, which leads to a deformation and to a swinging open of the flaps on the upper side of the container. The supporting body may be provided in a ring shape at an upper edge of the container in the closed position, so that by wetting the upper side of the portion pack with water, the closure means can optionally be loosened and in particular a deformation process is initiated which causes the flaps to swing open. The supporting body preferably includes of a material swellable by water, such as cardboard or a thick paper, so that a swelling process at a folding edge provides for corresponding pivoting movements at the flaps.

For effective production, the container with the supporting body in the closed position has an angular shape when viewed from above, in particular a pentagonal to octagonal shape, for example hexagonal. This means that a folding edge can be provided between the individual corners of the container, on each of which a flap is pivotably mounted.

The bottom of the container preferably has a tip of filter material that is not covered by the supporting body. This means that only the filter material which can be passed through during the preparation of the beverage is provided in a lower area, so that the supporting body does not impede the preparation process for the beverage. The tip may be frustoconical or pyramid shaped, wherein the area not covered by the supporting body occupies at least 30% of the height of to portion pack in the preparation position. In the use position with the tip of the portion pack pointing downwards, the height is measured in the vertical direction.

To increase the effective filter area, spacers, for example ribs, profiles, embossed portions or cut-outs, can be attached to the supporting body. This allows the supporting body to be positioned exactly in a filter vessel via the spacers. The filter material can be held at a distance from a filter vessel in the lower area.

The filter material can preferably be unfolded together with the supporting body on the upper side, wherein supporting body and filter material are glued together or mechanically fixed to each other for this purpose, lire filter material is folded in a starting (closed) position on an upper side of the container, i.e. it is arranged in several layers at least in some areas and can be held via the supporting body and or the closure means. After the closure means has been released, the filter material can then be pivoted with the flaps of the supporting body so that the area of the filter material which, in a starting position, forms an upper cover for the portion pack, forms a side wall after opening and pivoting, so that the extraction material contained in the portion pack can expand accordingly during preparation.

In another aspect of the invention there is provided a method which in one embodiment comprises a inserting a portion pack in a device for preparing beverages, and then applying water to the portion pack and dissolving a closure means provided on the portion pack by moistening with water. The portion pack can be opened and a supporting body of the portion pack unfolded by releasing the closure means. Water is then applied to the extraction material arranged in the container for beverage preparation, so that the beverage preparation lakes place in an open position of live portion pack and the extraction material can expand accordingly.

Preferably, hot water is used to release the closure means, for example water that is between 70° and 100° hot. This hot water can be used both to dissolve the closure means and to unfold the supporting body by initiating local swelling processes by sucking up water, which leads to unfolding. A starling quantity of water is used to release the closure means and open the portion pack, for example 5 ml to 100 ml in particular 10 ml to 50 ml. This water can be used in addition to pre-moistening, swelling and degassing, especially when preparing coffee. This is also known as pre-brewing. After opening, a second quantity of water, in particular hot water, is added for the preparation of beverages. The second quantity of water may then comprise, for example, 100 ml to 500 ml, in particular 150 ml to 250 ml, depending on the quantity of beverage prepared.

When opening the portion pack, the flaps of the supporting body on top of the container are preferably pivoted between 90° and 180°, in particular between 110° and 150°, so that the extraction material is freely accessible from above and can expand upwards accordingly. The additional volume created by opening the flaps is at least as large, typically more than twice the original volume of the closed portion pack. The additional volume can also be used by the solvent. When preparing coffee, for example, a dispersion of ground coffee and water is created.

BRIEF DESCRIPTION OF THE DRAWING

The invention is explained in more detail below by means of several embodiment examples with reference to the attached drawings, wherein:

FIGS. 1 to 3 show several views of a portion pack in different positions;

FIG. 17 shows a view of the cut-out of the supporting body for the portion pack of FIGS. 11 to 16.

DETAILED DESCRIPTION OF THE INVENTION

A portion pack 1 comprises a container 2 of filter material, which has a lower tip 4 from which side walls extend which widen upwards. In the closed position shown in FIG. 1, a supporting body 3 is located at an upper edge of container 2 and surrounds it in a ring shape. The supporting body 3 is only provided in the area of an upper edge of the portion pack L while the downwardly projecting tip is not covered by the supporting body 3.

Figure 9:
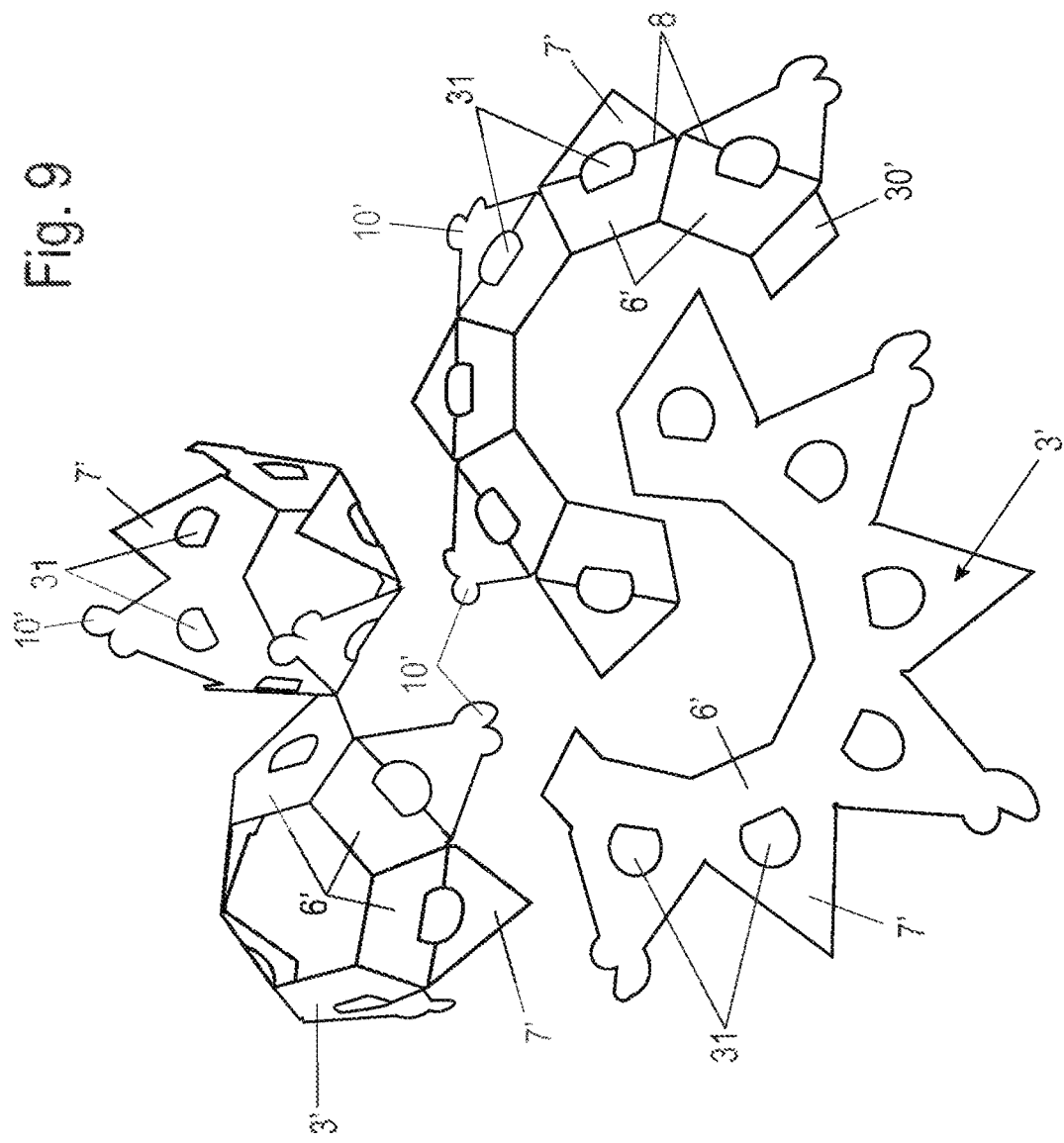
FIG. 9 shows views of a modified supporting body for a portion pack with integrated closure element.

The container 2 is formed in a pyramid-shaped manner and, starting from the tip 4, comprises several spreading side surfaces which are connected to each other by side edges 5. The supporting body 3 is of annular design in the region of these side faces and comprises sections 6 which cover the side face at least in the upper region which is preferably designed to be less than 50%, in particular 25-40%, of the total height of the closed portion pack 1, wherein the height direction in the position of use is preferably aligned vertically. These sections 6 are connected via folding edges 8 to form flaps 7 which, in a starting position, are arranged substantially horizontally on an upper side of the portion pack 1, wherein the flaps 7 can optionally also be oriented inclined to the horizontal. At least the portion pack 1 is closed in a starting position, wherein a closure means 10 is provided for this purpose, which is designed as a retaining means and holds the flaps 7 together in a central region. For this purpose, the closure means can be designed, for example, as a flat element which is glued to the tips of the flaps 7, preferably with an adhesive approved for the preparation of foodstuffs. In a further embodiment, the closure means may also be in the form of a mechanical latching means, which may be integrated into the geometry of the supporting body, as shown in FIG. 9 and described below.

FIG. 2 shows a central opening position of portion pack 1. By releasing the closure means 10, the flaps 7 of the supporting body can be pivoted around the folding edges 8, wherein an upper section of the filter material of container 2 is fixed to the flaps 7. The filter material is formed m a folded manner in the upper section in foe closed position and can then be unfolded by pivoting the flaps 7.

FIG. 3 shows portion pack 1 in an open position in which flaps 7 has e been pivoted by approximately 130°, i.e.

between 110° and 150°, and as a result an upper section 9 of the filter material, which is fixed to flaps 7 at least in some areas, has also been pivoted. In this opening position, the extraction material arranged in the position pack i is accessible from above and can, for example, be doused with hot water.

Figure 4:
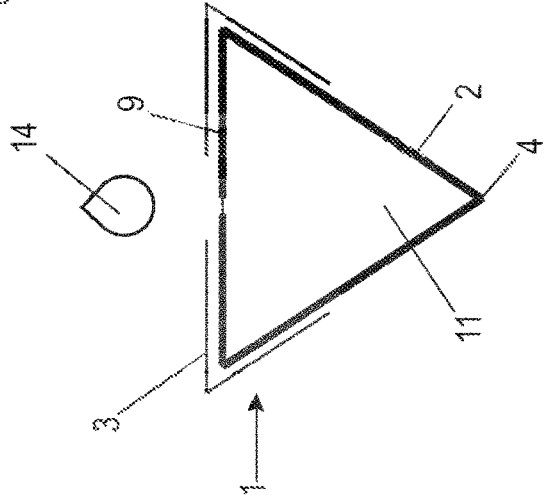
FIG. 4 shows a schematic view of a portion pack in a closed starting positions.

In FIG. 4, portion pack 1 is shown schematically to illustrate the process of beverage preparation. Portion pack 1 contains extraction material 11, especially ground coffee. Container 2, made of filter material, is essentially triangular in sectional view and comprises a lower tip 4 and an upper section 9, which is aligned essentially horizontally. A first quantity of water, in particular hot water, for example between 10 ml and 50 ml, as shown schematically by the drop 14, can release a closure means 10 arranged on the upper side of the portion pack 1. Moistening with water can loosen the adhesive, weaken the material of the closure means until it fails or reduces the stiffness of a plug connection so that no more holding forces can be generated by the closure means.

The first quantity of water is preferably large enough to allow the liquid to spread on the top of the portion pack 1 so that the supporting body 3 can also at least partially absorb water. Supporting body 3 is preferably made of cardboard or thick paper.

Figure 5:
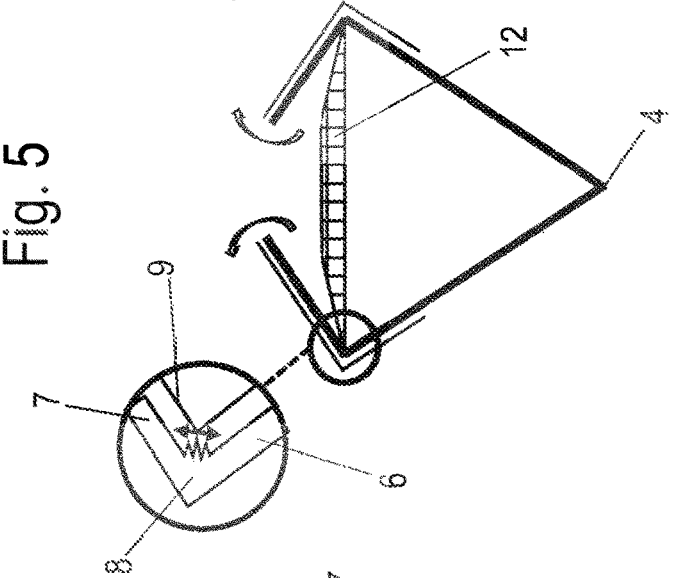
FIG. 5 shows a schematic view of the portion pack of FIG. 4 during the opening process.

As shown in FIG. 5, a local swelling process can be created at an upper folding edge 8 of the supporting body by wetting it with water, which causes an inner side of the folding edge to swell, so that a flap 7 pivots relative to section 6. The swelling is achieved by compressing die material of the supporting body 3 on the inside of the folded edge and by increasing its volume by absorbing water.

By pivoting the flaps 7, the portion pack 1 is opened upwards and hot water can now be applied to the extraction material 11, especially for making coffee or tea. Hie swelling of the extraction material increases its volume. This is shown in the drawing by the upper area as additional volume 12. The steps of pre-moistening, swelling and degassing are particularly important when preparing high-quality coffee.

Figure 6:
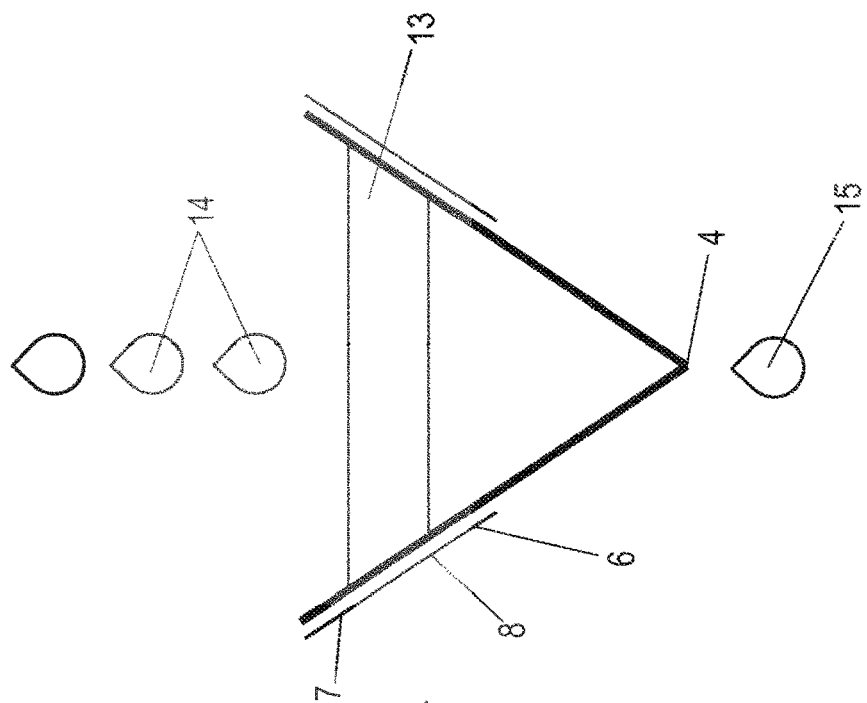
FIG. 6 shows a schematic view of the portion pack of FIG. 4 during the preparation of the beverage.

FIG. 6 shows the brewing process for preparing beverages schematically. A second quantity of water as shown by drops 14 is applied from above to the portion pack 1 to brew the extraction material 11, in particular ground coffee. The extraction material can increase in size towards the top and also disperse with the solvent, as occurs particularly with ground coffee during the brewing process. This is shown in the drawing as additional volume 13, which exceeds the volume of the dry ground coffee. The filtered beverage 15 emerges from the side walls, collects at the bottom, symbolized by the drop, and can be collected in a cup for example. After preparing the drink, the user can easily grasp the portion pack by the flaps 7 and dispose of it.

Figure 7:
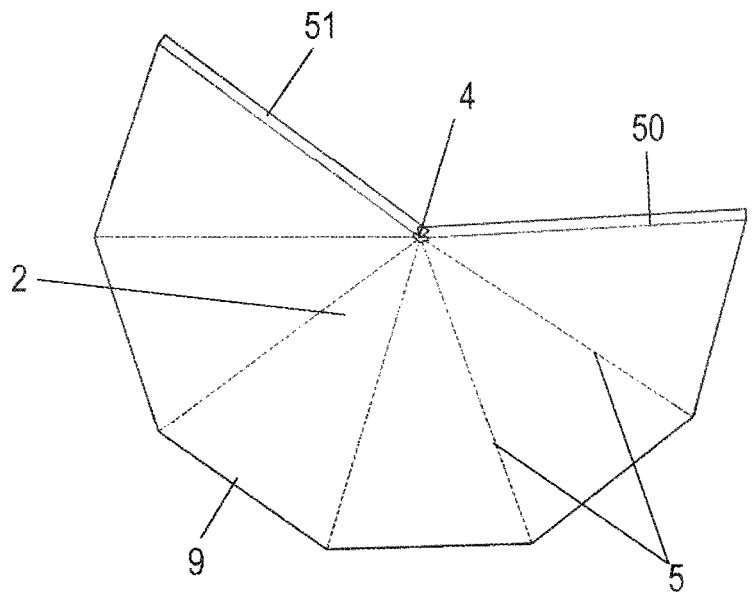
FIG. 7 shows a view of a cut-out of the filler material for a portion pack.

FIG. 7 shows a cut-out of the filter material before it is made into a container 2. In a flat position, the filter material is substantially circular in shape, with straight edges instead of a rounded circumference being provided on the outer circumference, wherein alternatively arcs may be provided instead of the edges, in any case, the cut-out of filter material has two edge strips 50 and 51, which meet at a tip 4 and are joined together, for example by gluing or embossing, to obtain a shell-, cone- or pyramid-shaped basic shape. The filter material consists preferably of filter paper.

Figure 8:
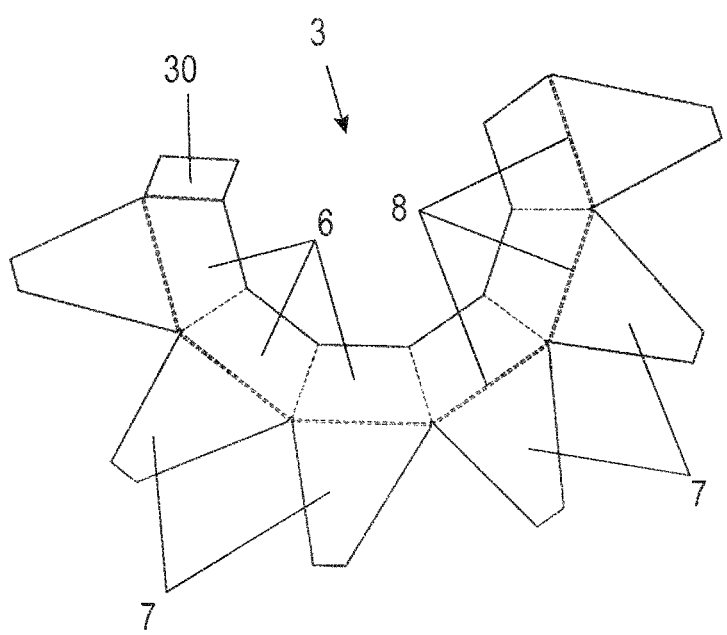
FIG. 8 shows a view of a cut-out of a supporting body for a portion pack.

FIG. 8 shows a cut-out of the supporting body 3 in flat condition. The supporting body 3 comprises an open annular section on which outwardly projecting flaps 7 are provided. The flaps 7 are designed in a V-shaped or cone-shaped manner and taper outwards. The flaps 7 are connected to contiguous sections 6 by folding edges 8, wherein an edge section 30 is integrally formed on one end section 6, which is connected to a section 6 at the opposite end, in particular by gluing, sealing or embossing, in order to produce an annular supporting body 3. The flaps 7 can then be joined at least in some areas to the upper section 9 of the filter material to produce a portion pack 1, again preferably by the joining techniques of gluing, sealing or embossing. In one embodiment, contact between the container comprised of filter material and the supporting body may be minimized by beads, ribs or punched portions connecting the container to the supporting body.

FIG. 9 shows a modified material cut-out of a supporting body 3', which is shown in different positions and assembly states. The supporting body 3' is flat in a starting position and comprises contiguous sections 6' on an inner circumference forming an open ring. From the sections 6', flaps 7' protrude outwardly, which are formed in a V-shaped manner, wherein a recess 31, also referred to herein as a "cutout," is formed on each flap. To produce a supporting body 3', the flat cut-out is first provided with folding edges 8, so that the flaps 7' are pivotably mounted on the sections 6'. On individual flaps 7', projections 10' are formed as closure means, which protrude at the ends of the flaps 7'. When the supporting body 3' has been formed into a ring over an section 30', it is arranged on a container 2 made of filter material, which is filled with an extraction material, in particular ground coffee. The flaps 7', which may be at least partially connected to the section 9 of the filter material, are then pivoted into a closed position, in which case the closure means is formed by the projections 10' which provide mechanical locking of the portion pack. This can eliminate the need for an additional element and the use of adhesive. In this embodiment example too, opening of the portion pack is effected by the use of hot water applied to an upper side of the portion pack, so that swelling processes at the supporting body 3', especially in the area of the folding edges 8, partly in combination with pretensions in the supporting body, ensure that the flaps 7' overcome the holding forces by the projections 10' and then pivot. The opening process can be influenced by modifying the recesses 31.

Figure 10:
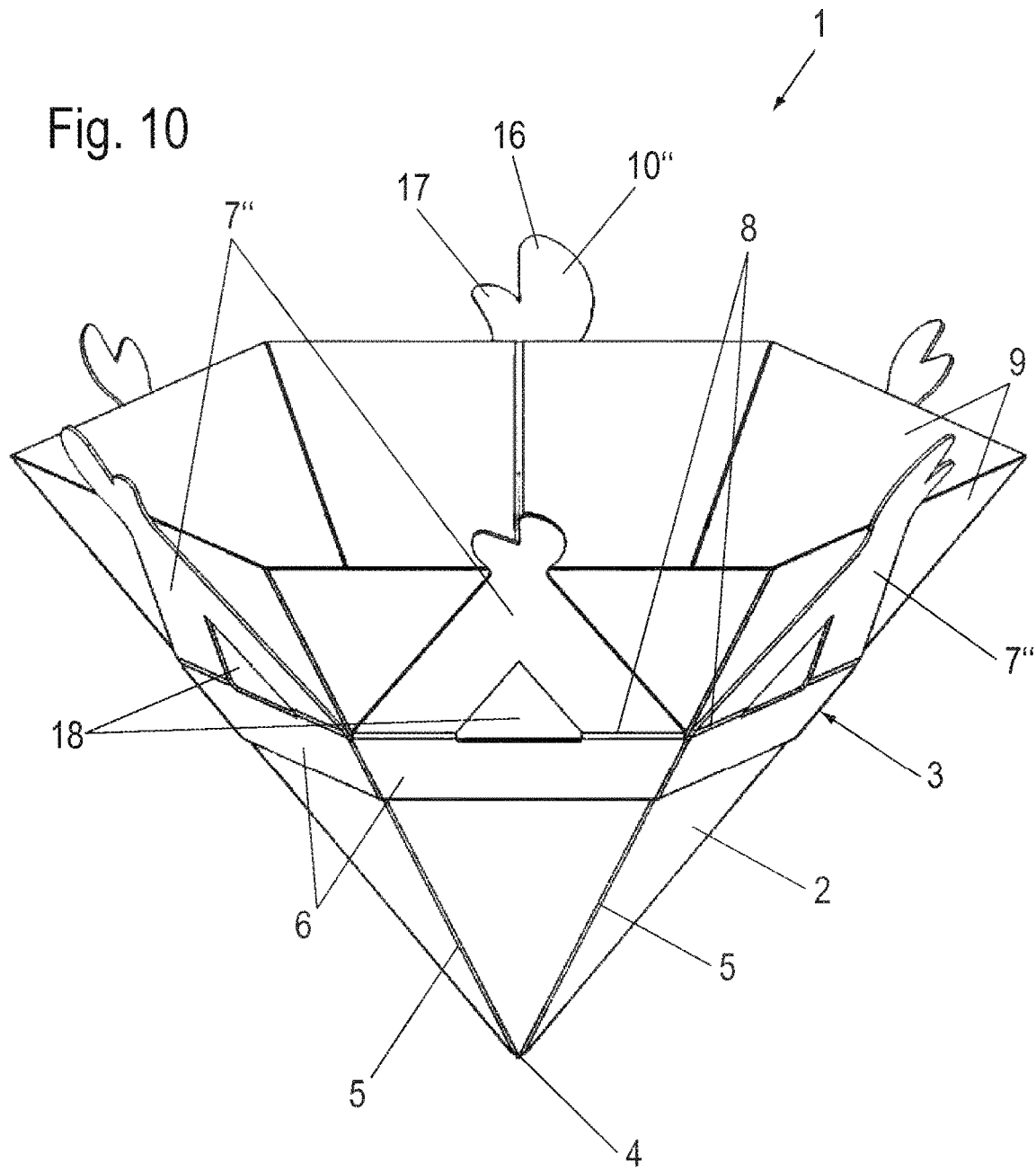
FIG. 10 shows a perspective view of a portion pack in an open position according to another embodiment example.
Figure 11:
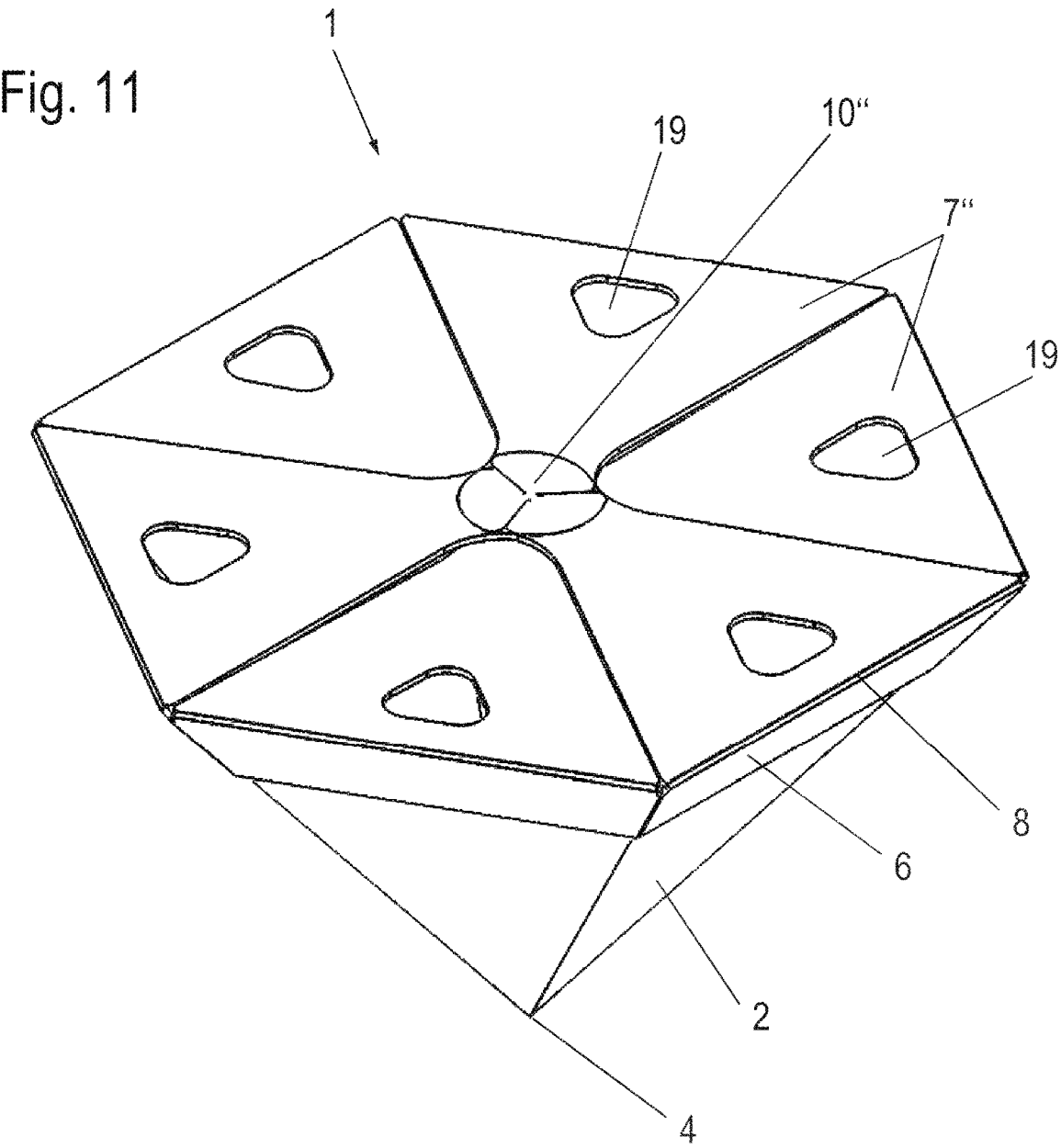
FIG. 11 shows a perspective view of a portion pack in an closed position.

In order to optimize the opening speed, between 20% and 50% can be recessed on the surrounding folding edge 8. If there are no recesses on the folding edge as in FIG. 8, the flaps 7 open at a slower speed than with recesses 18 as shown in FIG. 10 but with more force. Optional recesses 19, which are not located at the edge 8 but on the surface of the flaps 7" as shown in FIG. 11, also have an influence on the opening behavior, as the bending stiffness of the flaps 7" and thus the function of the closure means 10" is affected.

In the embodiment example shown, the portion packs are intended for making coffee. Of course it is also possible to make other beverages, especially tea or mixed coffee beverages. By opening the portion pack, the extraction material used can expand and swell without causing problems in the preparation of the beverage. Furthermore, completely soluble extraction material can also be used; in the production of cocoa drinks, for example, the filter element ensures that no undissolved lumps end up in the beverage.

FIG. 10 shows a portion pack in an open position according to another embodiment example. As in the previous embodiment examples, the portion pack 1 comprises a container 2 made of a liquid-permeable filter material, in particular filter paper, around which a supporting body 3 is arranged in a ring shape. The container 2 is substantially formed in a pyramid-shaped manner with a tip 4 arranged at the bottom in the position of use, from which several side walls of filter material are arranged spreading upwards, which are connected to one another via side edges 5.

The supporting body 3 may be made of cardboard or thicker paper and includes lateral sections 6 which may be joined to the filter material of container 2 at the side edges, for example by gluing. The lateral sections are thereby formed in strips and are only arranged in an upper area of the side walls so that adjacent to the tip 4 the filter material is not covered b the sections 6. In a further embodiment container 2 is only connected to the supporting body at the flaps 7".

The supporting body 3 comprises at the lateral sections 6 pivotable arms or flaps 7", which are each connected to a lateral section 6 via a folding edge 8. In the embodiment example shown, six flaps 7 are provided, which are essentially triangular in shape and surround an interior of container 2 in the manner of a hexagon. A section of filter material is fixed to the flaps 7", for example by gluing, so that when the flaps 7" move, the filter material is also pivoted. A recess 18 is provided on each flap 7" to facilitate opening. It is also possible to make do without a recess 18 in the area of the flaps 7".

Figure 12:
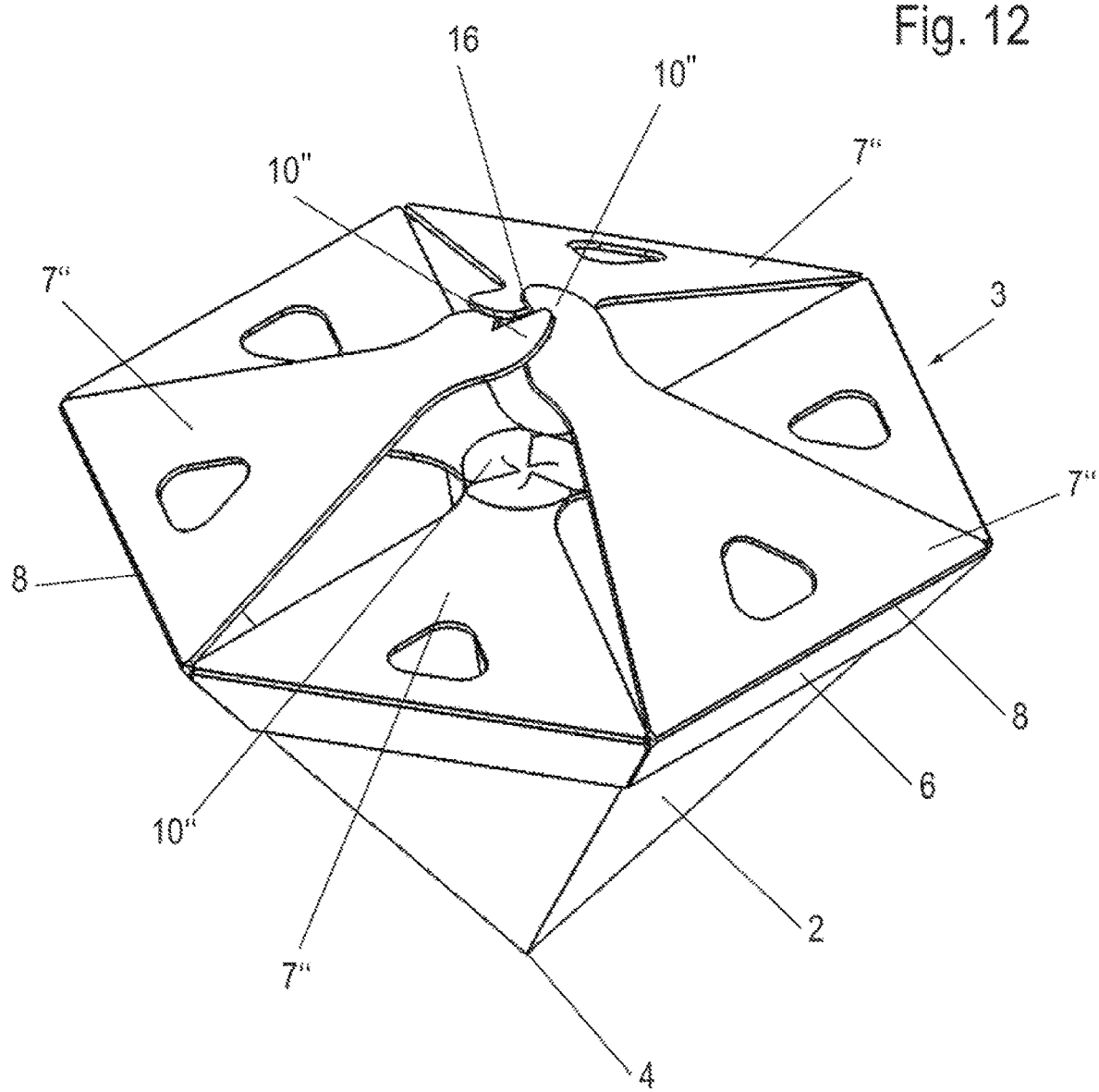
FIGS. 12 to 16 show several views of the portion pack of FIG. 11 during an opening process.
Figure 13:
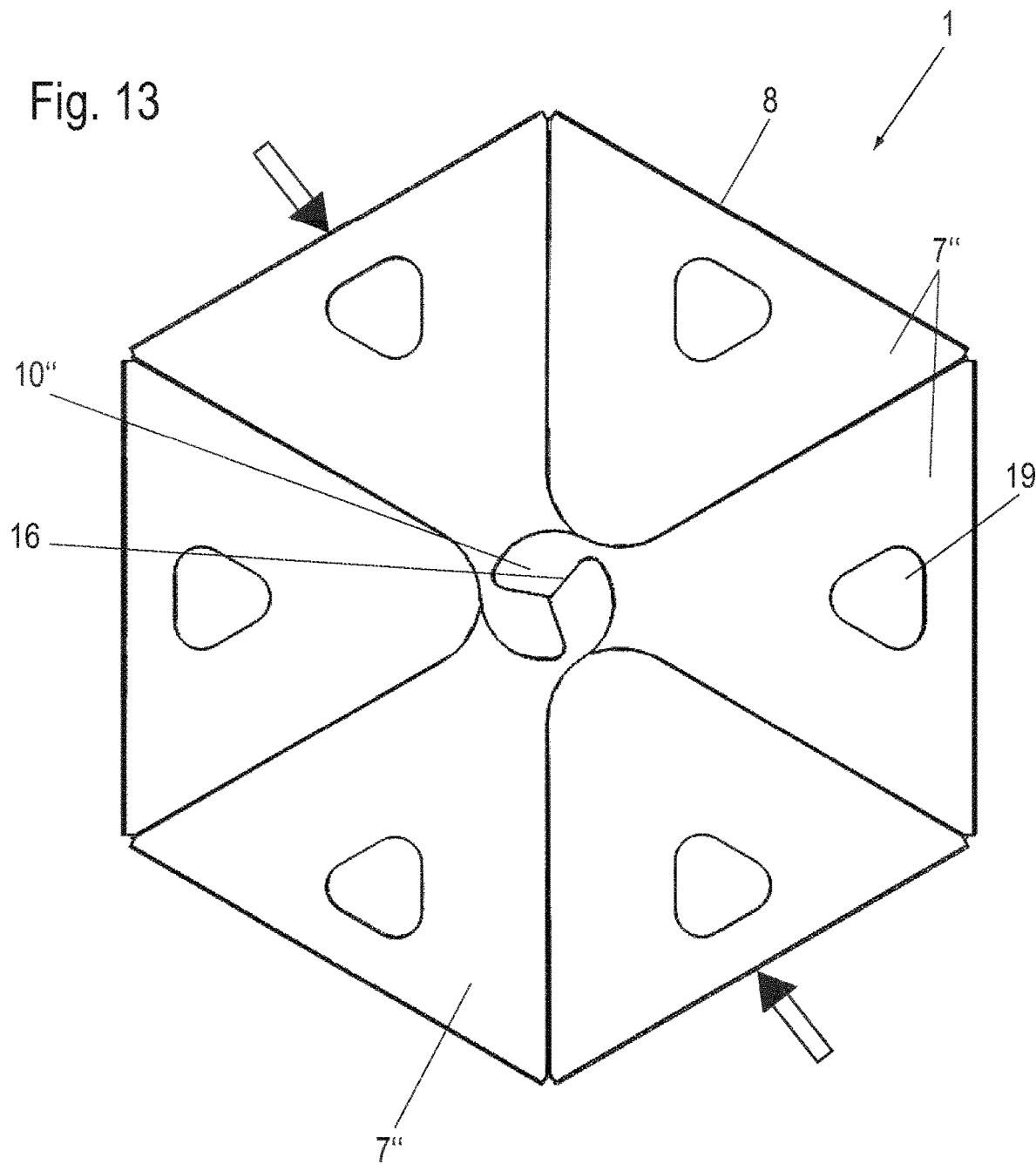

Referring, for example, to FIG. 10, each flap 7" is provided with a closure means 10" at the end, which has a guide edge 16 and a latching projection 17. The closure means 10" of two, three or four flaps 7" can be locked together by folding the closure means 10" on top of each other, for example as shown in FIGS. 12 and 13.

Container 2 contains an extraction material, especially ground coffee or tea.

FIG. 11 shows portion pack 1 in a closed position in which it is formed in a pyramid-shaped manner. Portion pack 1 can thus be inserted into a machine for preparing a brewed beverage. Compared to FIG. 10, recesses 19 in FIG. 11 do not extend to the folding edge 8 but are slightly smaller, otherwise the embodiment example of FIG. 11 corresponds to FIG. 10. Depending on the desired functionality, recesses 19 can have different geometries or can be dispensed with.

The opening process is explained in more detail with reference to FIGS. 12 to 16. In order to open the portion pack 1, the flap 7" can be opened either manually or by applying a liquid, especially hot water, which causes swelling processes at, the supporting body 3 in the area of the folding edges 8 and causes automatic opening.

In FIG. 12, three flaps 7" have been slightly opened, and it can be seen that these three flaps 7" overlap each other in the area of the closure means 10" and can be pivoted together around the respective folding edges 8. Three further flaps 7" are still in the closed, locked position in FIG. 12, so that in this position, the three closed flaps 7" prevent the escape of ground coffee. In order to explain the opening process, the upper sections 9 of the filter material in FIGS. 12 to 15 have been omitted in the area of the flaps 7".

FIG. 13 shows the portion pack 1 of FIG. 12 in a top view. If the portion packet 1 is subjected to impact or pressure, as symbolized by to arrows, it may be possible to open the three upper flaps 7", the closure means 10" of which are located above the closure means 10" of the three lower flaps 7" in the closed position. However, portion pack 1 remains closed because the closure means 10" of the three lower flaps 7" remain locked in case of torsion due to shear load, either the lower or the upper spoke triplet formed by the flaps 7" stabilizes the closure, depending on the direction, since the guide edges 15 and the latching projections 17 are oriented alternately in one or the other direction, as best shown in FIG. 10.

Figure 14:
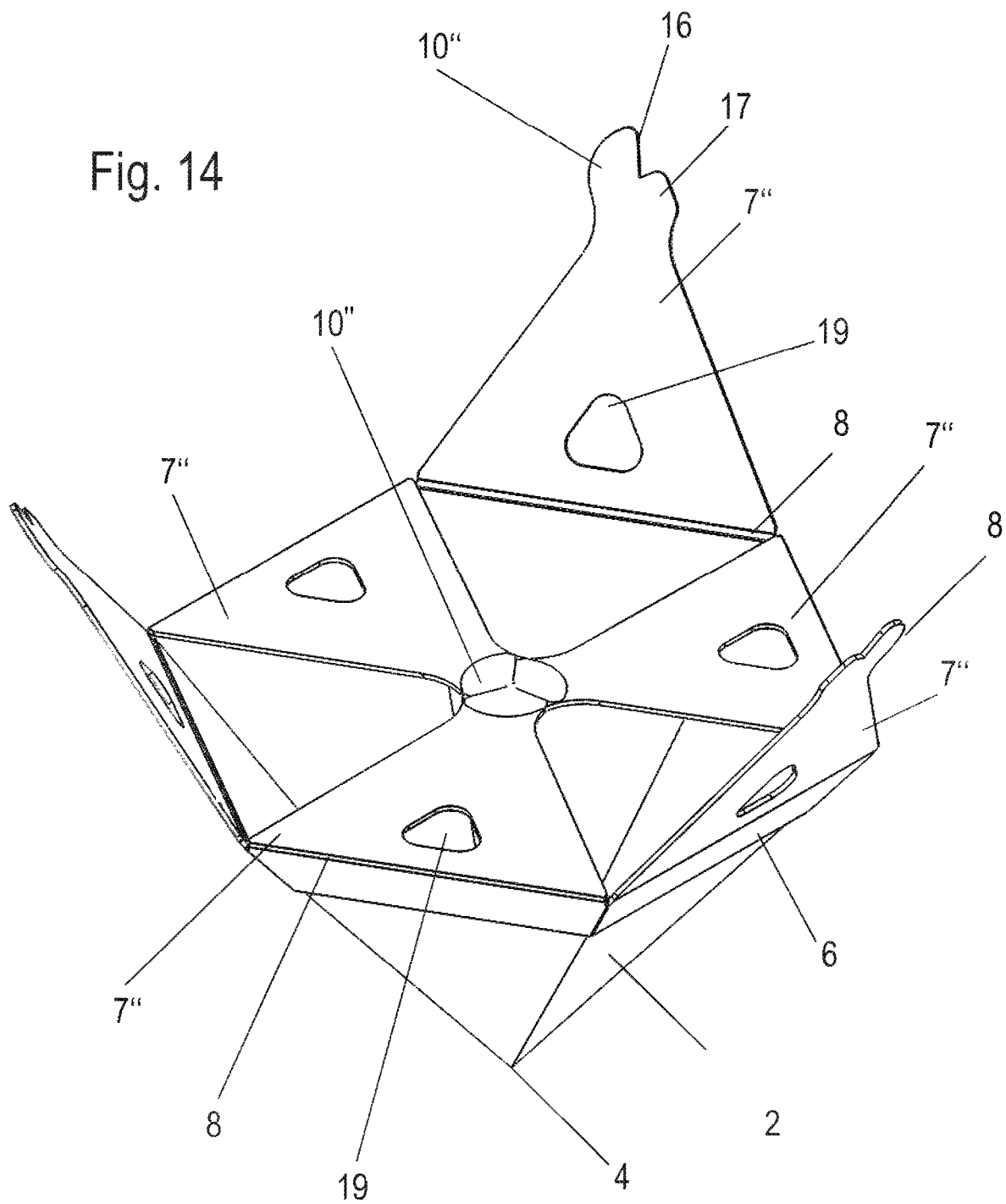

In FIG. 14 the three flaps 7" have been pivoted by more than 90°, while the three lower flaps 7" are still locked by the closure means 10". It can be seen that the three lower flaps 7" still essentially seal container 2, wherein the filter material in the area of the lower flaps 7" additionally seals the opening on portion pack 1.

Figure 15:
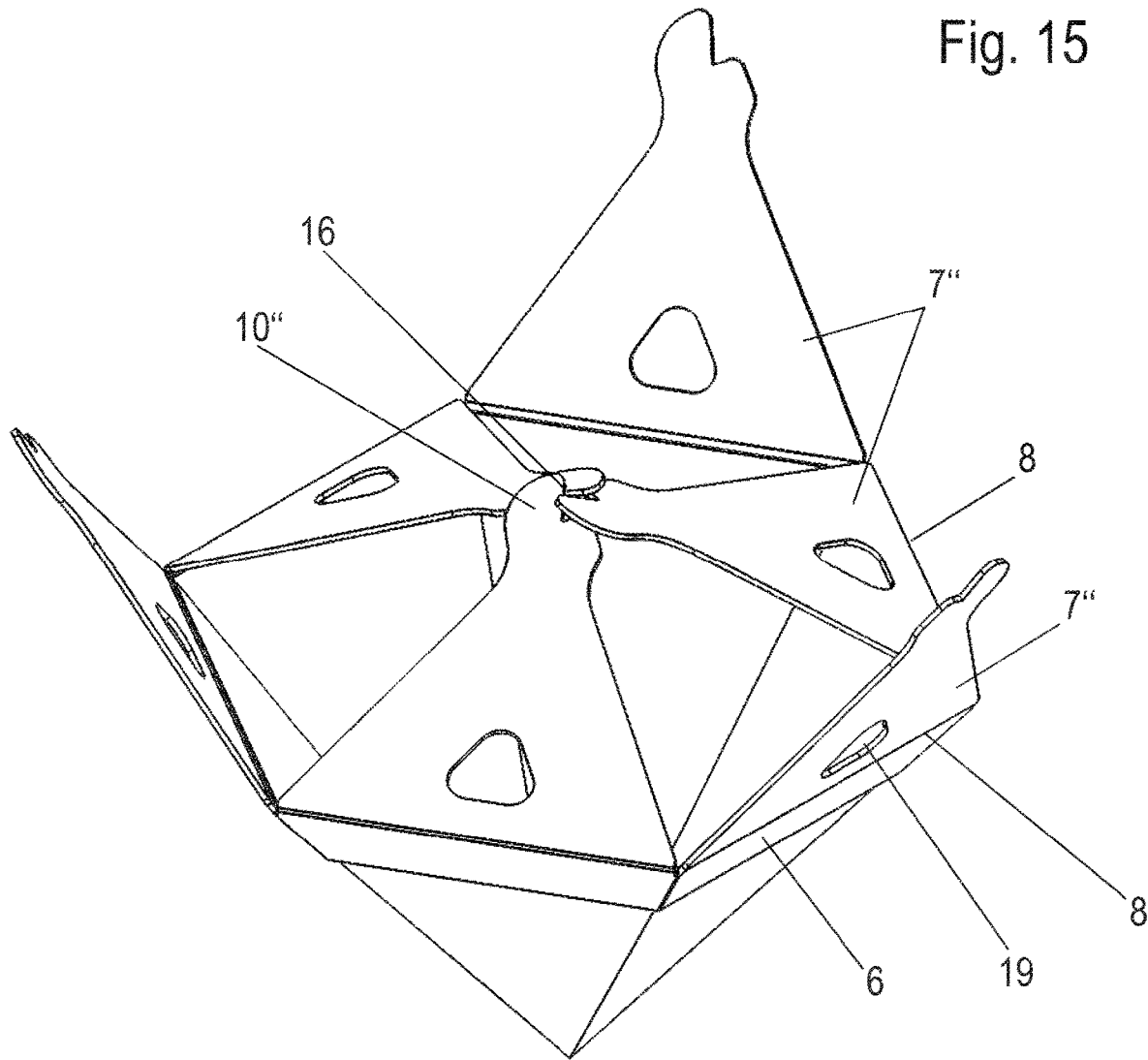
Figure 16:
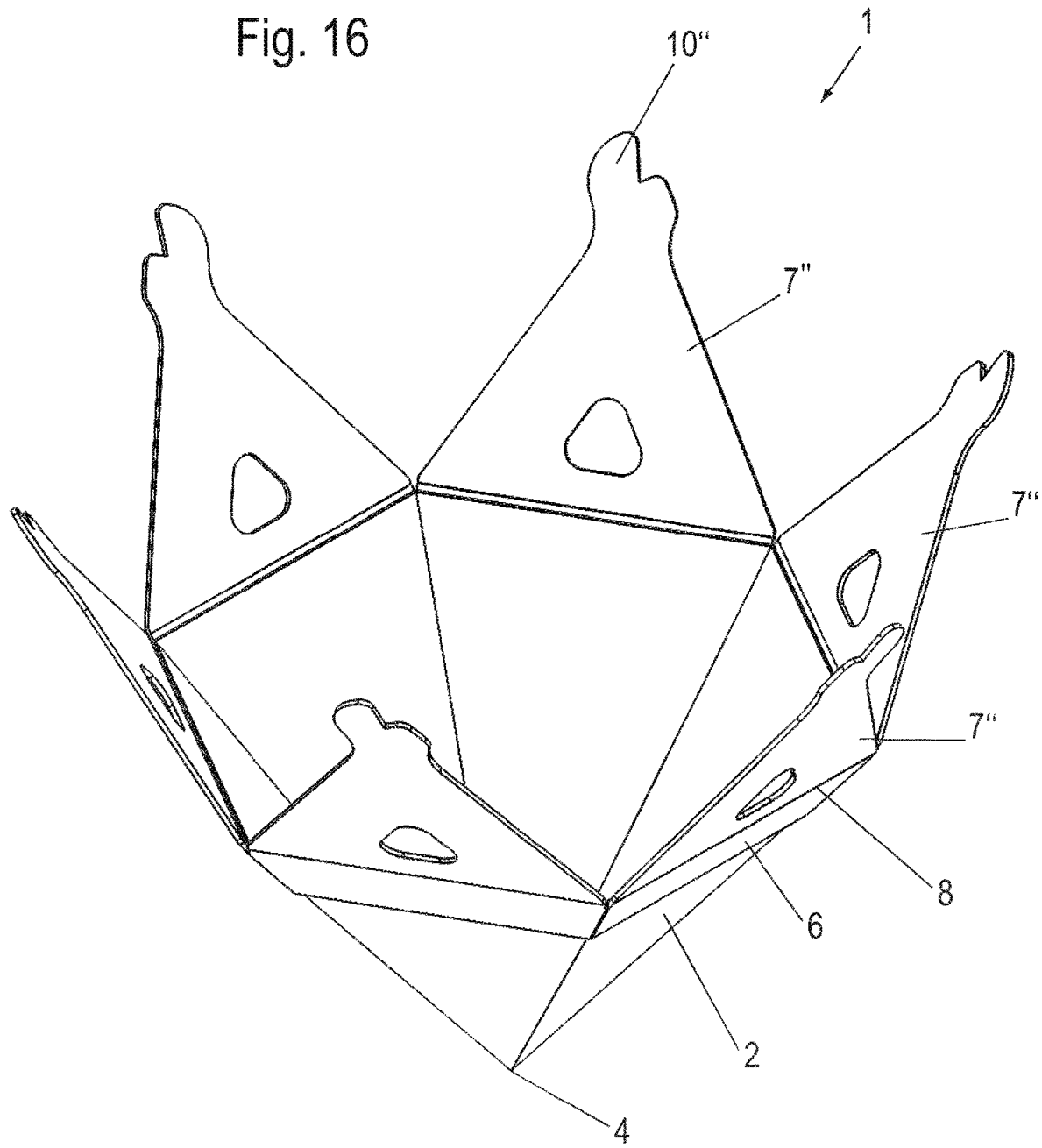

FIG. 15 shows the lower flaps 7" in a slightly open position where the upper closure means 10" is unlocked. FIG. 16 shows the portion pack 1 in a fully open position, with no filter material being shown in the area of the flaps 7" to allow a better view of the opening mechanism. In addition, portion pack 1 is also not filled with extraction material.

When portion pack 1 is opened by a liquid via swelling processes, the six flaps 7" are opened substantially simultaneously, wherein the flaps 7" are opened only briefly one after the other with the upper closure means 10", which are arranged above the closure means 10 of the lower flaps 7". The swelling processes cause the flaps 7" to be pivoted essentially simultaneously.

FIG. 17 shows the supporting body 3 in a cut-out. The supporting body 3 is manufactured as an integral component from cardboard and comprises six arms or flaps 7", each of which is connected to a lateral section 5 via folding edges 8. The lateral sections 6 can be folded in a ring along folding edges 33, wherein a connecting web 34 is formed on one end section 6, which can be connected to an opposite lateral section 6, for example by gluing. A recess 31 is provided on the connecting web 34, which can be brought into alignment with a recess 32 on an end lateral section 6 for aligning the supporting body 3 during gluing. The cut-out of filter material may also be made in one piece and glued together along a connecting section or joined by stamping to produce a bag-shaped container 2. The supporting body 3 is preferably placed on the outside of the filter material but can optionally be placed on an inside of the filter material. Furthermore, the number of flaps 7" can also be varied.

The invention claimed is:

1. A portion pack for producing a beverage from an extraction material, comprising:
    a container comprised of a filter material in which the extraction material is to be arranged, the container having a side wall comprised of the filter material, an upper side, and at least one pivotable edge portion comprised of the filter material pivotably connected to the side wall and initially arranged in a closed position to close the upper side of the container;
    a supporting body surrounding the container at least in some areas, the supporting body including at least one folding flap connected to the at least one pivotable edge portion and a folding edge connected to the at least one folding flap and being constructed to urge the at least one folding flap upwardly toward a position to place the pivotable edge portion of the container in an open position; and
    a closure element to hold the at least one pivotable edge portion of the container in the closed position and which is adapted to be releasable by moistening the supporting body, wherein upon release of the closure element the at least one pivotable edge portion is automatically pivoted upwardly by the folding edge to the open position in which the upper side of the container is open and ready for beverage preparation.

2. The portion pack according to claim 1, wherein the supporting body comprises a material which is swellable by water.

3. The portion pack according to claim 2, wherein the folding edge adjacent the side wall of the container is compressed in the closed position of the pivotable edge portion.

4. The portion pack according to claim 3, wherein absorption of moisture by the folding edge causes the compressed material of the folding edge to expand, thereby pivoting the at least one flap together with the at least one pivotable edge portion upwardly to the open position after release of the closure element.

5. The portion pack according to claim 1, wherein the supporting body includes a plurality of sections arranged on the side wall of the container and the at least one flap includes a plurality of flaps each hinged via a respective one of the folding edges to the sections of the supporting body on the side wall of the container.

6. The portion pack according to claim 5, wherein the supporting body has an annular shape on an upper edge of the container in the closed position.

7. The portion pack according to claim 5, wherein each of the flaps of the supporting body includes a cutout that extends at least to the folding edge to which the flaps are hinged to the respective sections, and each recess occupies between 20% to 50% of the length of the respective folding edge.

8. The portion pack according to claim 1, wherein the supporting body comprises cardboard.

9. The portion pack according to claim 1, wherein the container with the supporting body in the closed position has one of a pentagonal to octagonal shape in a top view of the portion pack.

10. The portion pack according to claim 1, wherein the container has a tip of filter material on an underside opposite the upper side which is not covered by the supporting body.

11. The portion pack according to claim 1, wherein the at least one pivotable edge portion of the filter material constitutes an upper section of the filter material which is foldable together with the at least one folding flap of the supporting body.

12. The portion pack according to claim 1, wherein the filter material is folded at the upper side of the container in the closed position and is held in the closed position by at least one of the supporting body and the closure element.

13. The portion pack according to claim 1, wherein the container has a volume in the beverage preparation position of the pivotable edge portion that is more than twice as large as the initial volume of the container in the closed position of the at least one pivotable edge portion.

14. A method for producing a beverage with a portion pack according to claim 1, comprising the steps of:
inserting a closed portion pack comprising a container made of filter material in a device for preparing beverages;
applying water to the closed portion pack to release a closure element provided on the portion pack by moistening with water;
opening the portion pack by releasing the closure element and unfolding a supporting body on the container, and
applying water to the extraction material arranged in the container for beverage preparation.

15. The method according to claim 14, including using hot water to release the closure element.

16. The method according to claim 15, including applying the water in an amount between 5 ml to 100 ml to release the closure means.

17. The method according to claim 14, the method further including pivoting the at least one folding flap between 90° and 180 during the opening step.

* * * * *